(12) United States Patent
Chien

(10) Patent No.: US 8,485,706 B2
(45) Date of Patent: Jul. 16, 2013

(54) SECURING DEVICE FOR CONNECTING REFLECTOR TO ADJUSTMENT UNIT OF VEHICLE HEADLIGHT

(75) Inventor: Chin-Hsun Chien, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 202 days.

(21) Appl. No.: 13/039,592

(22) Filed: Mar. 3, 2011

(65) Prior Publication Data

US 2012/0224915 A1 Sep. 6, 2012

(51) Int. Cl.
*F21V 7/00* (2006.01)
(52) U.S. Cl.
USPC .............................. 362/515; 403/315; 403/319
(58) Field of Classification Search
USPC .... 403/122, 149, 315, 319, 289, 290; 24/545, 24/546, 910; 362/421, 515, 528
See application file for complete search history.

(56) References Cited

U.S. PATENT DOCUMENTS

| 3,234,616 | A | * | 2/1966 | Wantland | 24/546 |
| 4,318,161 | A | * | 3/1982 | Shanks | 362/528 |
| 4,894,754 | A | * | 1/1990 | Levilain | 362/528 |
| 5,322,252 | A | * | 6/1994 | Puente | 362/421 |
| 5,508,896 | A | * | 4/1996 | Suehiro et al. | 362/528 |
| 5,704,100 | A | * | 1/1998 | Swan | 24/546 |
| 6,550,947 | B1 | * | 4/2003 | Kibayashi | 362/515 |
| 6,557,220 | B1 | * | 5/2003 | Hamm, Jr. | 24/705 |
| 6,976,773 | B2 | * | 12/2005 | Cavanna | 362/515 |

FOREIGN PATENT DOCUMENTS

EP 0 308 777 * 3/1989

* cited by examiner

*Primary Examiner* — Michael P Ferguson
(74) *Attorney, Agent, or Firm* — Rosenberg, Klein & Lee

(57) ABSTRACT

A securing device for connecting a reflector to an adjustment unit includes a connector connected to the reflector and a holding member is connected to the connector. The holding member includes a space and a slot defined axially through a wall of the holding member. Two notches are defined in two ends of the slot respectively. A securing member includes a frame which includes two upright portions and two transverse portions connected between the two upright portions. The two upright portions are engaged with the notches and one of the two transverse portions has a gap which is expanded when the neck of the adjustment rod of the adjustment unit passes therethrough. The sphere on the adjustment rod is located in the space and the securing member clamps the two ends of the slot to prevent the sphere from disengaged form the space.

6 Claims, 11 Drawing Sheets

SECURING DEVICE FOR CONNECTING REFLECTOR TO ADJUSTMENT UNIT OF VEHICLE HEADLIGHT

FIELD OF THE INVENTION

The present invention relates to a securing device, and more particularly, to a securing device for connecting a reflector to an adjustment unit of a vehicle headlight.

BACKGROUND OF THE INVENTION

A conventional vehicle headlight is shown in FIG. 1 and generally includes a reflector 10 and an adjustment unit 30 which adjusts the position of the reflector 10. A connector 20 is connected to the back of the reflector 10 and includes a holding member 201 which includes a cylindrical space 202 and a slot is defined axially through the wall of the holding member 201, the slot communicates with the cylindrical space 202. The adjustment unit 30 includes an adjustment rod 301 which includes a sphere 302 at a distal end thereof.

The sphere 302 of the adjustment rod 301 is inserted into the cylindrical space 202 via the top or bottom opening of the holding member 201, and the adjustment rod 301 extends out from the slot as shown in FIG. 2. When the adjustment rod 301 is activated to retract or extend, the angular position of the reflector 10 is adjusted. However, because the holding member 201 includes the top and bottom openings, so that the sphere 302 may drop from the top and bottom openings as shown in FIG. 3, and the adjustment rod 301 is separated from the holding member 201.

The present invention intends to provide a securing device which includes a securing member which clamps two ends of the slot of the holding member to secure the adjustment rod within the cylindrical space of the holding member.

SUMMARY OF THE INVENTION

The present invention relates to a securing device for connecting a reflector to an adjustment unit of a vehicle headlight, wherein the securing device comprises a connector connected to the reflector and a holding member is connected to the connector. The holding member includes a space and a slot is defined axially through a wall of the holding member. The slot communicates with the space. Two notches are defined in two ends of the slot respectively. A securing member comprises a frame which comprises two upright portions and two transverse portions connected between the two upright portions. The two upright portions are engaged with the notches. One of the two transverse portions has two sections extending toward each other and the gap is defined between the two sections. Each section has an extension section extending therefrom to form an entrance which communicates with the gap. The space receives the sphere and the gap is expanded by the neck of the adjustment rod.

Preferably, the securing member is made by metal wire.

Preferably, the two ends of the slot each have a wing connected thereto and a recess is defined between each of the wings and the end of the slot.

Preferably, the two sections defining the gap each have a first guide section connected thereto, the two first guide sections are located to form a tapered opening defined therebetween.

Preferably, the two second guide sections are respectively connected to the first guide sections and define an entrance which is a tapered entrance and communicates with the gap.

Preferably, each of the two upright portions of the securing member has a bent engaging portion which is engaged with the recess corresponding thereto.

Preferably, the other one of the two transverse portions of the securing member has a bent portion which is located corresponding to the slot of the holding member.

Preferably, the entrance and the gap of the securing member bounce back after they are expanded.

The primary object of the present invention is to provide a securing device to prevent the reflector from disengaged from the adjustment rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
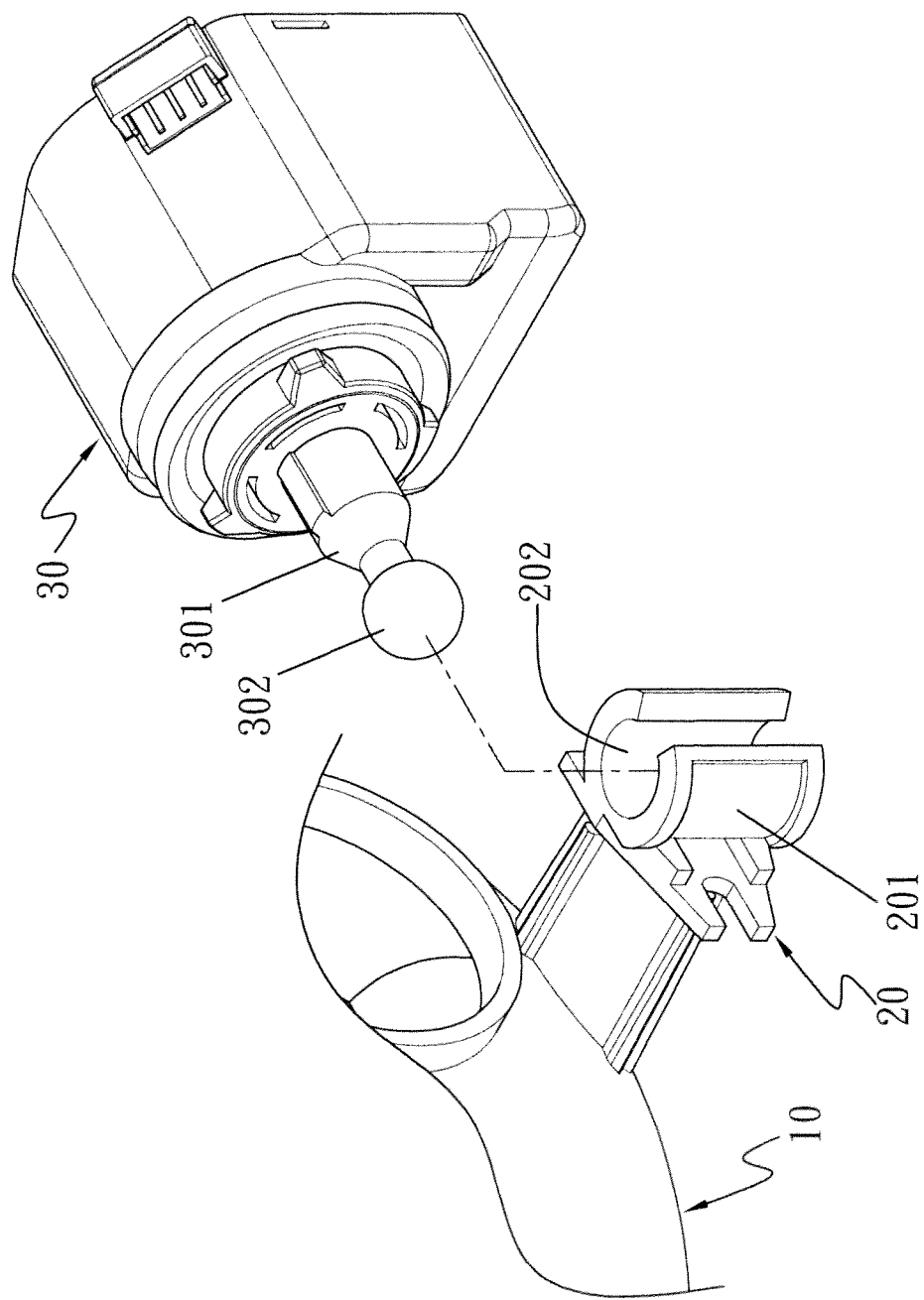
FIG. 1 is an exploded view to show the conventional reflector and the conventional adjustment unit.
Figure 2:
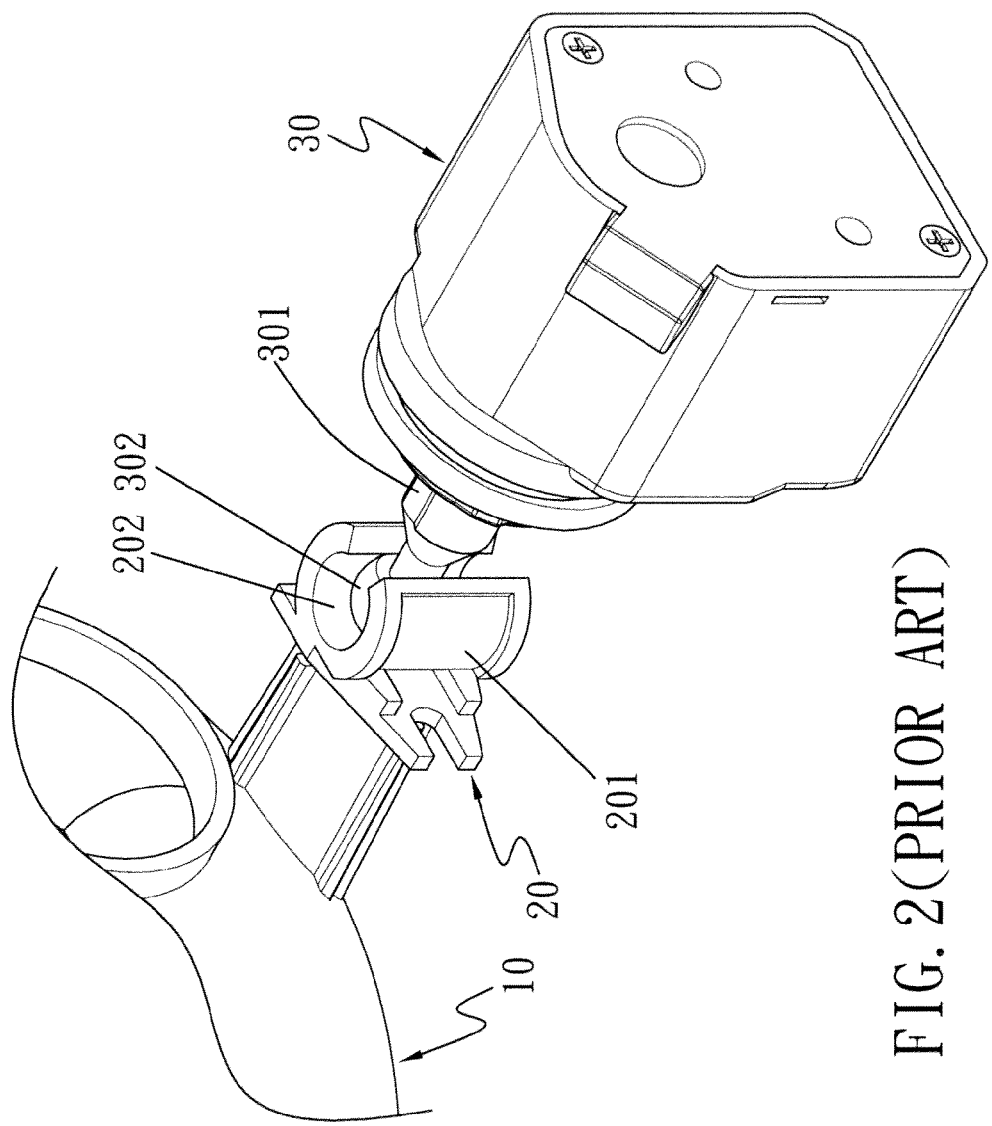
FIG. 2 is a perspective view to show the conventional reflector and the conventional adjustment unit.
Figure 3:
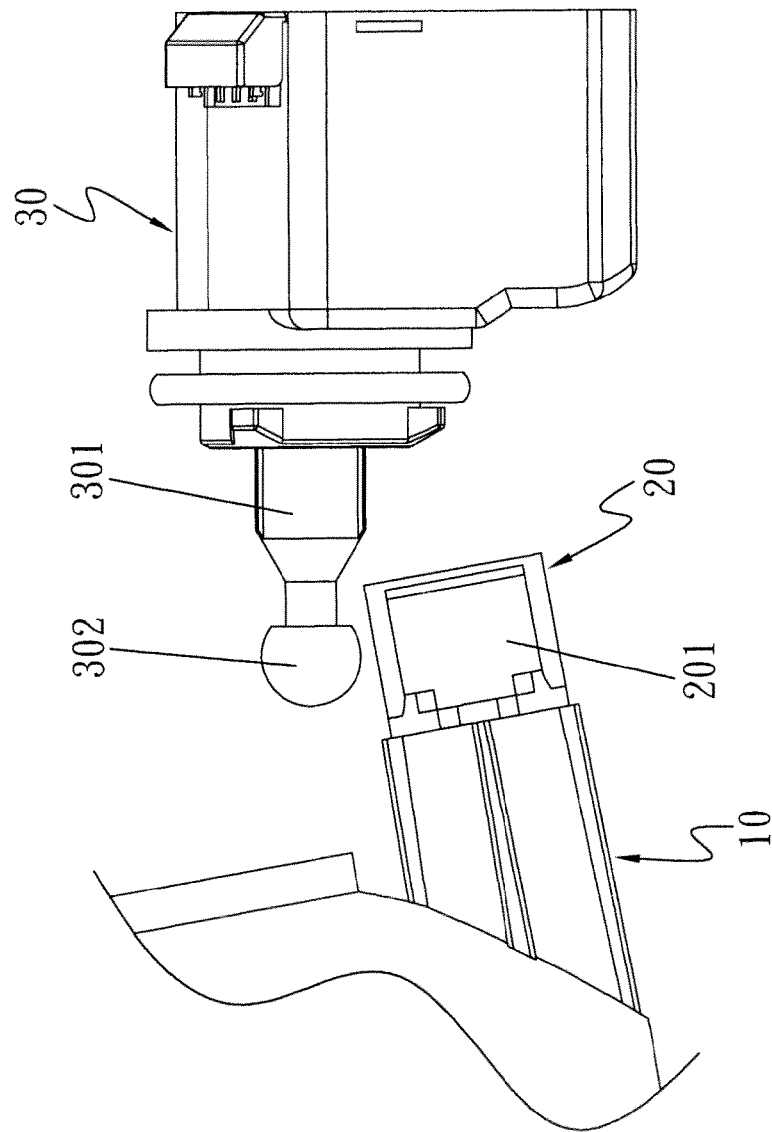
FIG. 3 shows that the conventional adjustment rod is disengaged from the conventional holding member on the reflector.
Figure 4:
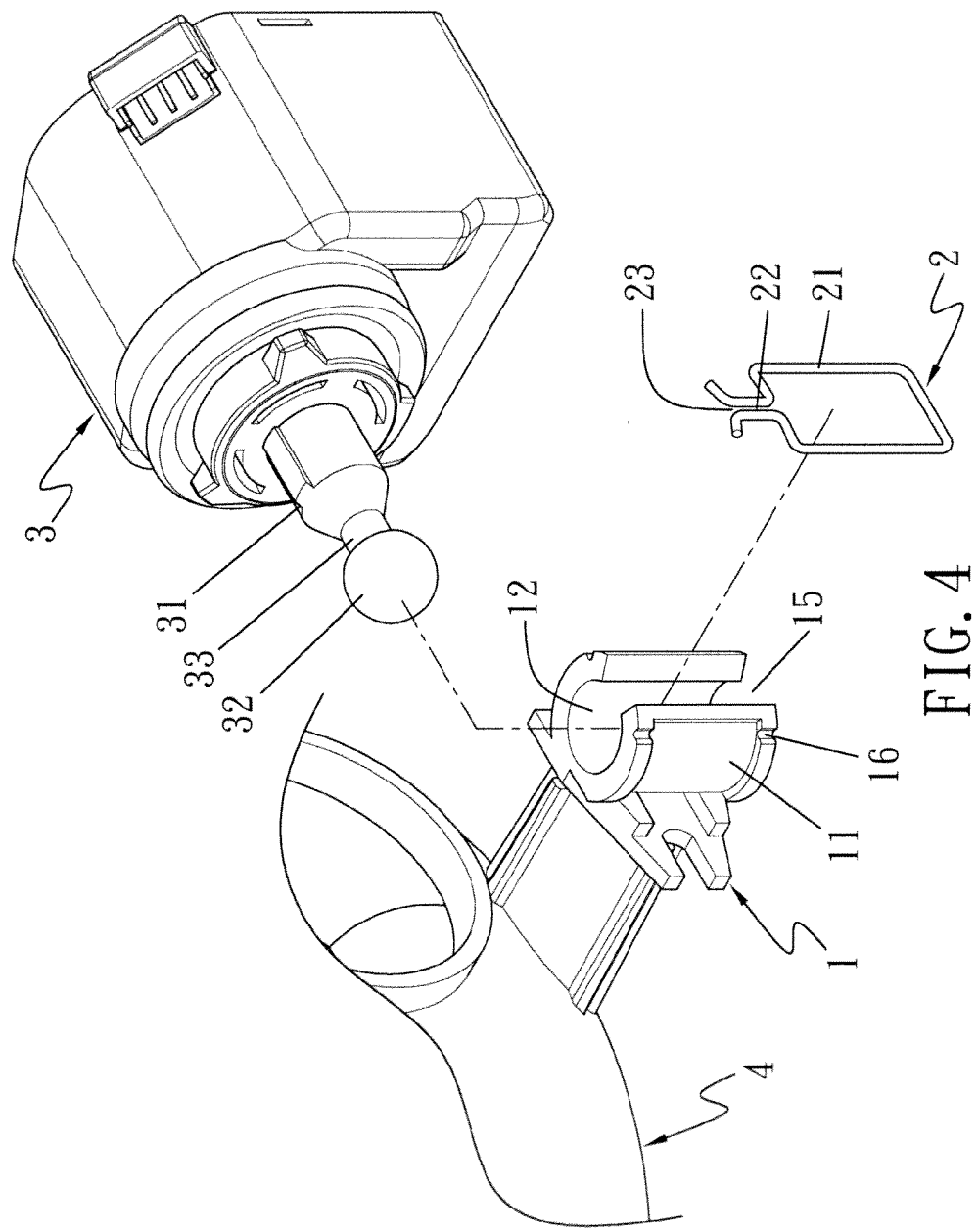
FIG. 4 is an exploded view to show the reflector, the adjustment unit and the securing member of the present invention.

Referring to FIG. 4, the securing device of the present invention for connecting a reflector 4 to an adjustment unit 3 of a vehicle headlight comprises a connector 1 connected to the back of the reflector 4 and a holding member 11 is connected to the connector 1. The holding member 11 includes a space 12 and a slot 15 is defined axially through a wall of the holding member 11. The slot 15 communicates with the space 12. Two notches 16 are defined in two ends of the slot 15 respectively. The adjustment unit 3 comprises an adjustment rod 31 which has a sphere 32 at a distal end thereof and a neck 33 is connected to the sphere 32. The sphere 32 is to be received in the space 12 and the adjustment rod 31 extends from the slot 15.

The securing member 2 of the present invention has a frame 21, a gap 22 and an entrance 23, wherein the securing member 2 is made by metal wire. The frame 21 is a rectangular frame and comprises two upright portions and two transverse portions which are connected between the two upright portions. The two upright portions 21 are engaged with the notches 16 so as to clamp the two ends of the slot 15 toward each other. One of the two transverse portions has two sections extending toward each other and the gap 22 is defined between the two sections. Each section has an extension section extending therefrom to form the entrance 23 which communicates with the gap 22. The entrance 23 and the gap 22 of the securing member 2 bounce back after they are expanded. The diameter of the neck 33 is larger than the widths of the gap 22 and the entrance 23.

Figure 5:
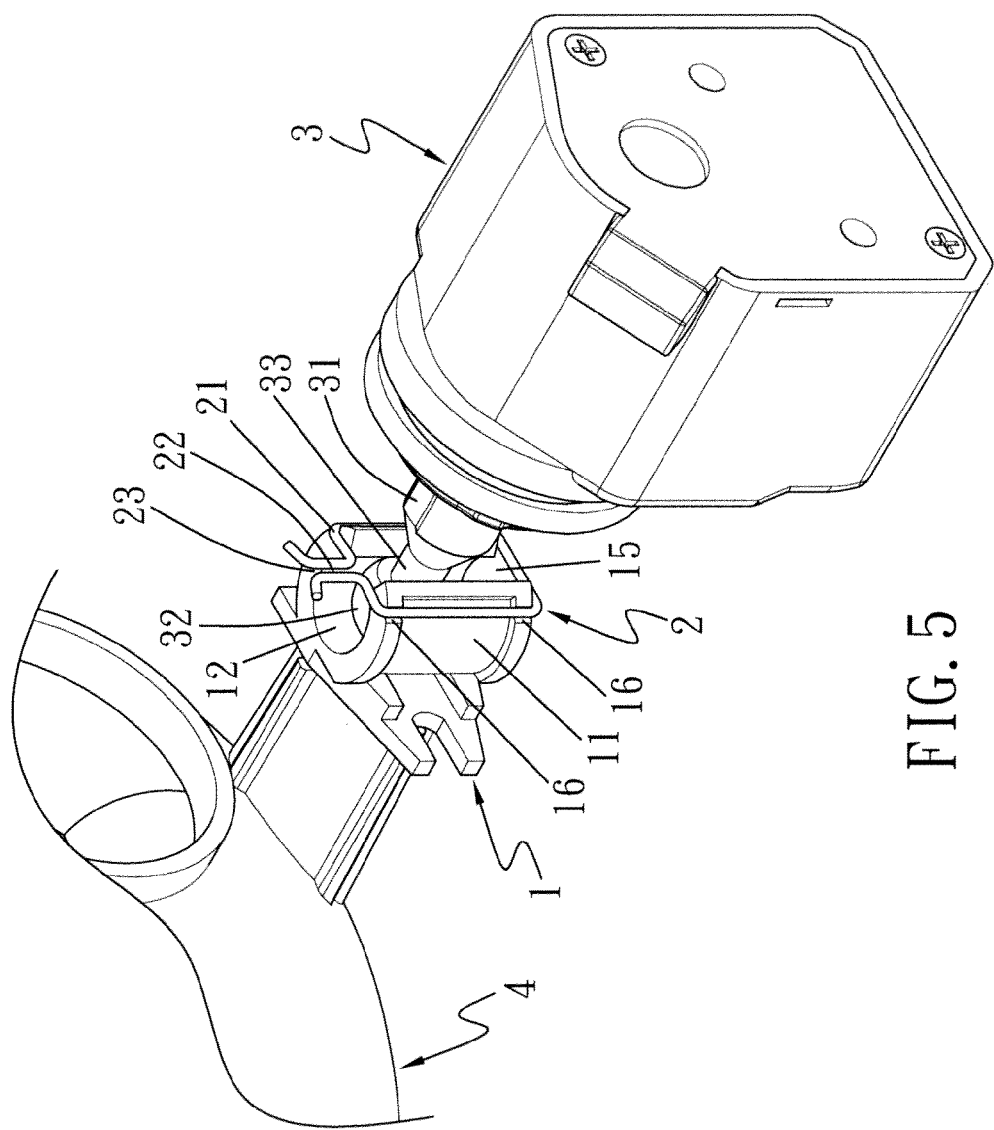
FIG. 5 is a perspective view to show that the securing member of the present invention securely clamps the holding member to hold the sphere of the adjustment rod.
Figure 6:
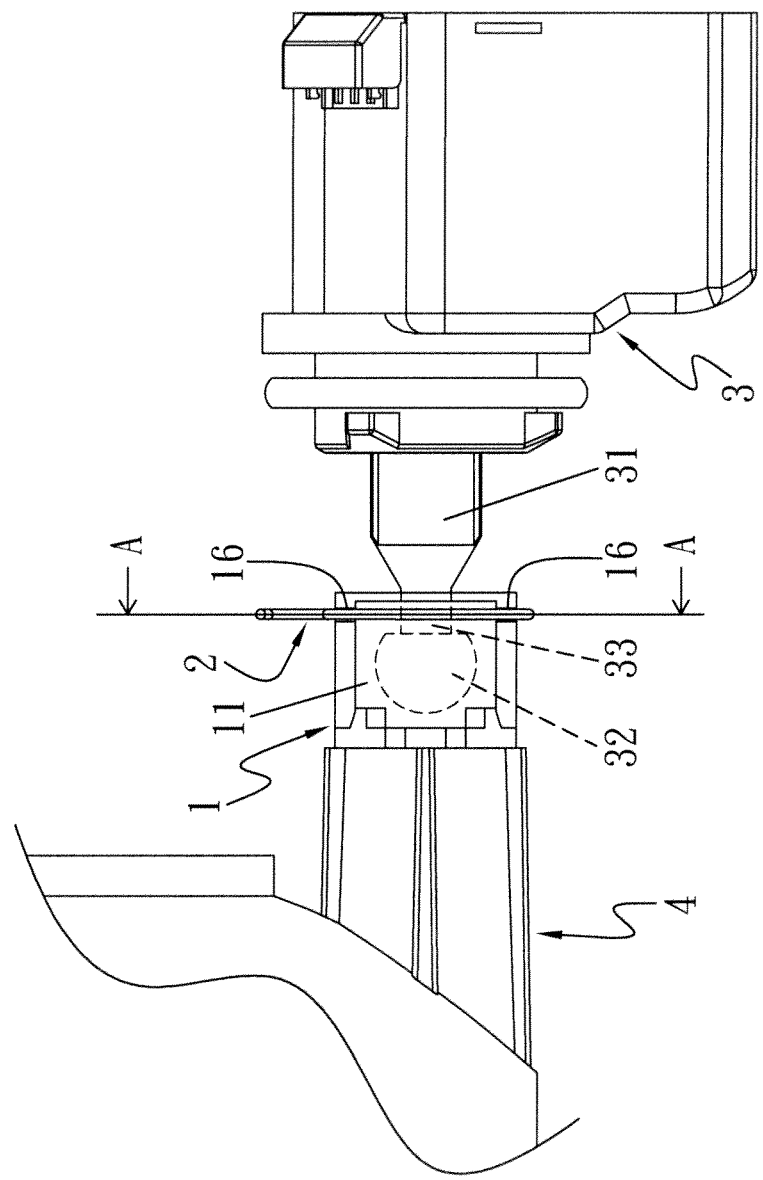
FIG. 6 is a side view to show that the securing member of the present invention securely clamps the holding member to hold the sphere of the adjustment rod.
Figure 7:
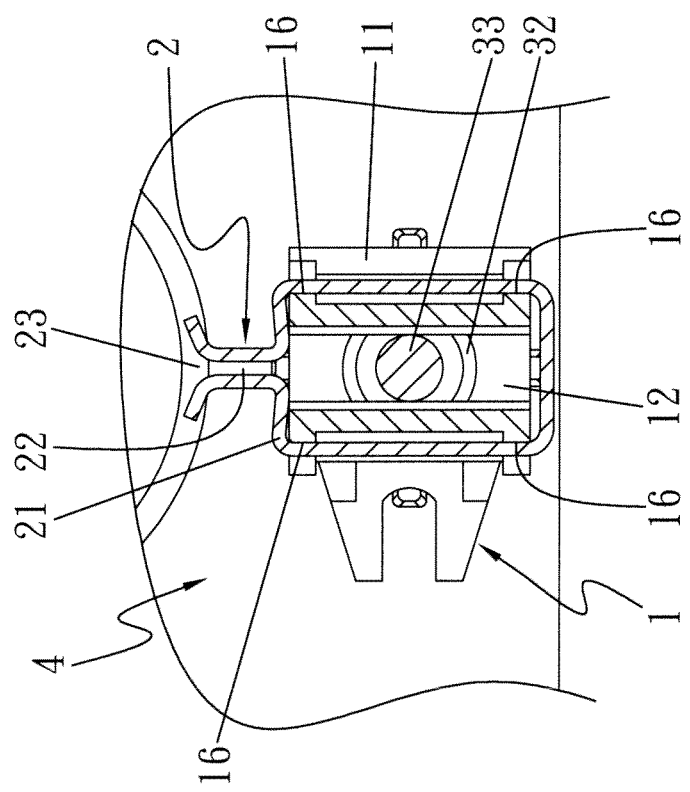
FIG. 7 is an end cross sectional view, taken along line A-A in FIG. 6.
Figure 8:
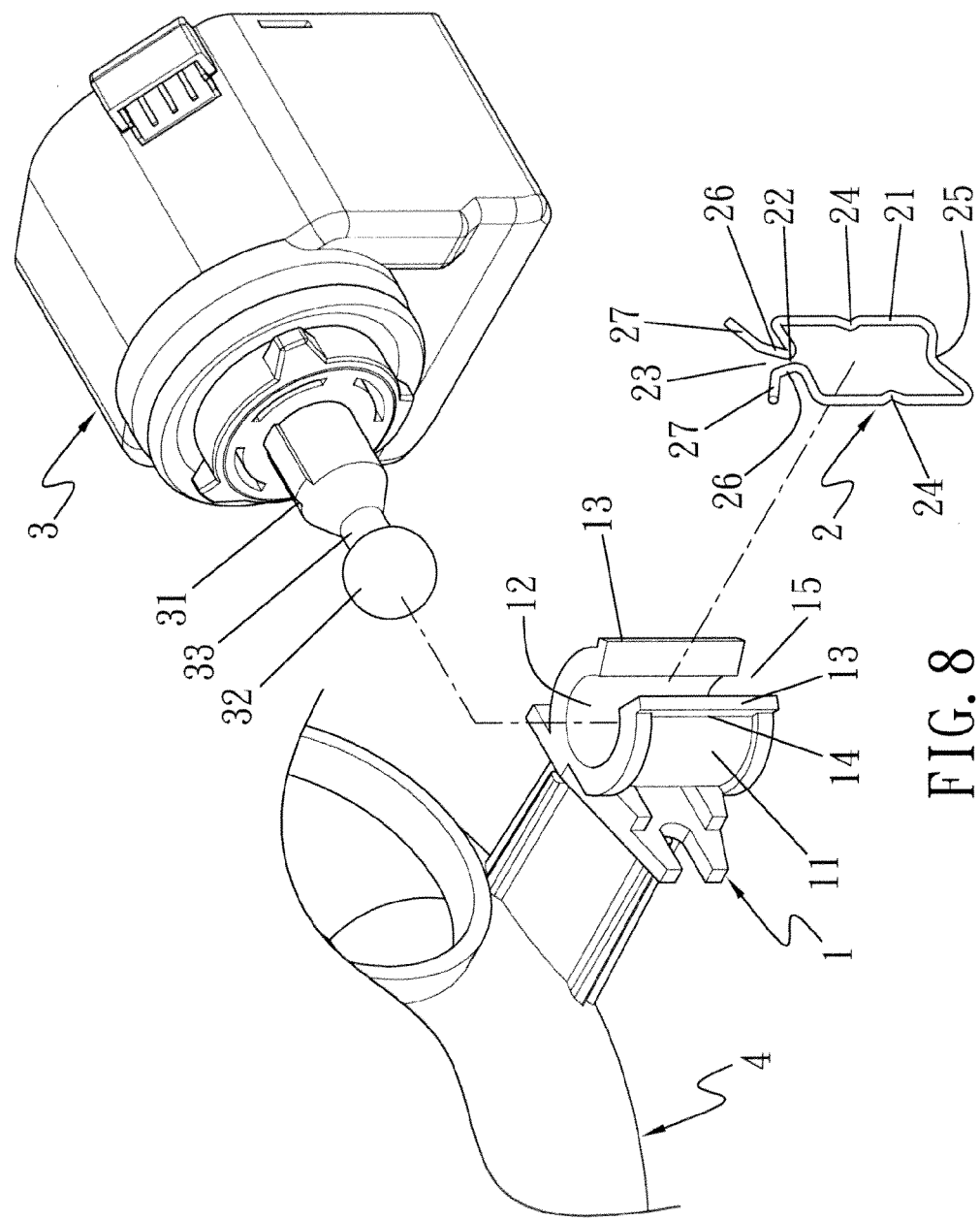
FIG. 8 is an exploded view to show the reflector, the adjustment unit and the second embodiment of the securing member of the present invention.
Figure 9:
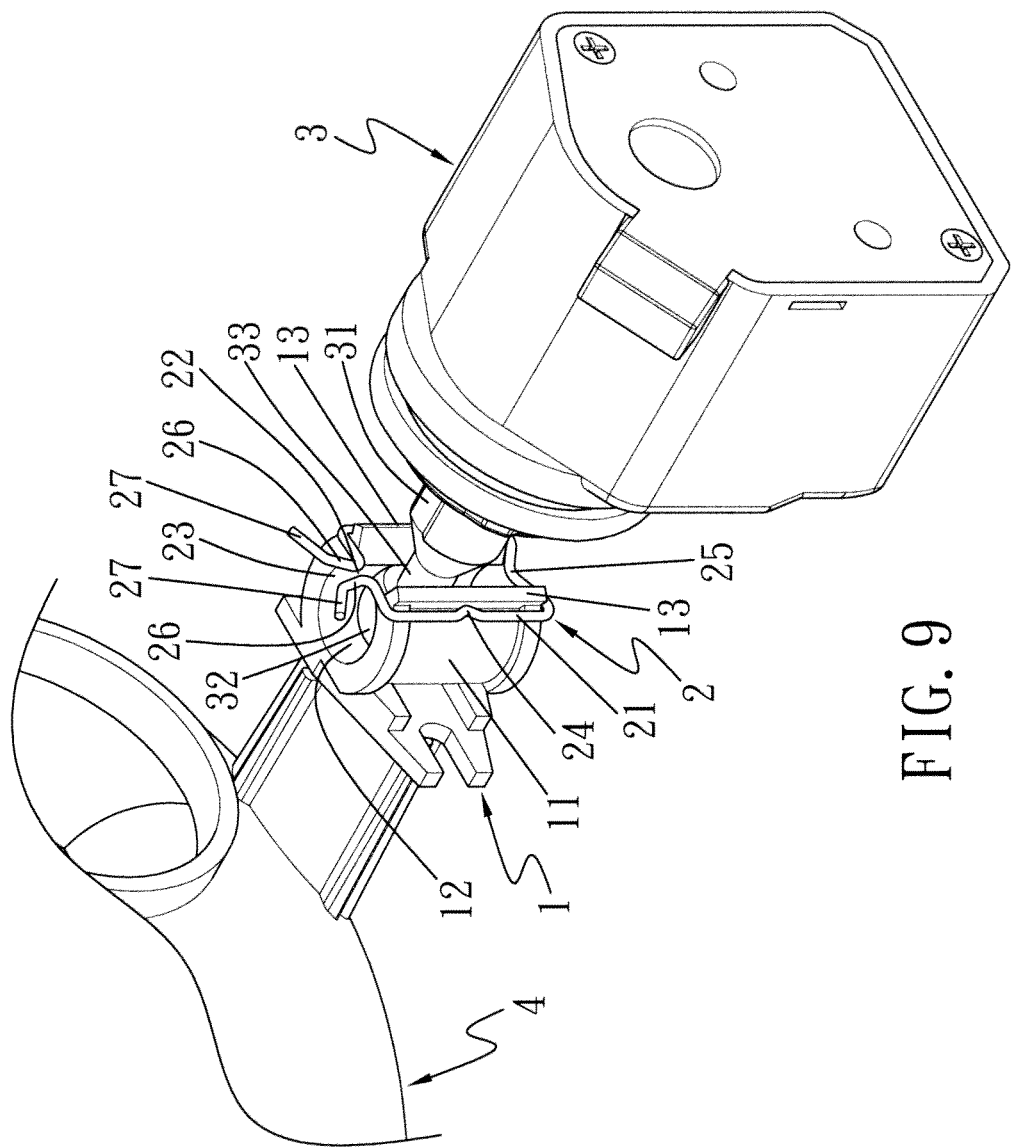
FIG. 9 is a perspective view to show that the second embodiment of the securing member of the present invention securely clamps the holding member to hold the sphere of the adjustment rod.
Figure 10:
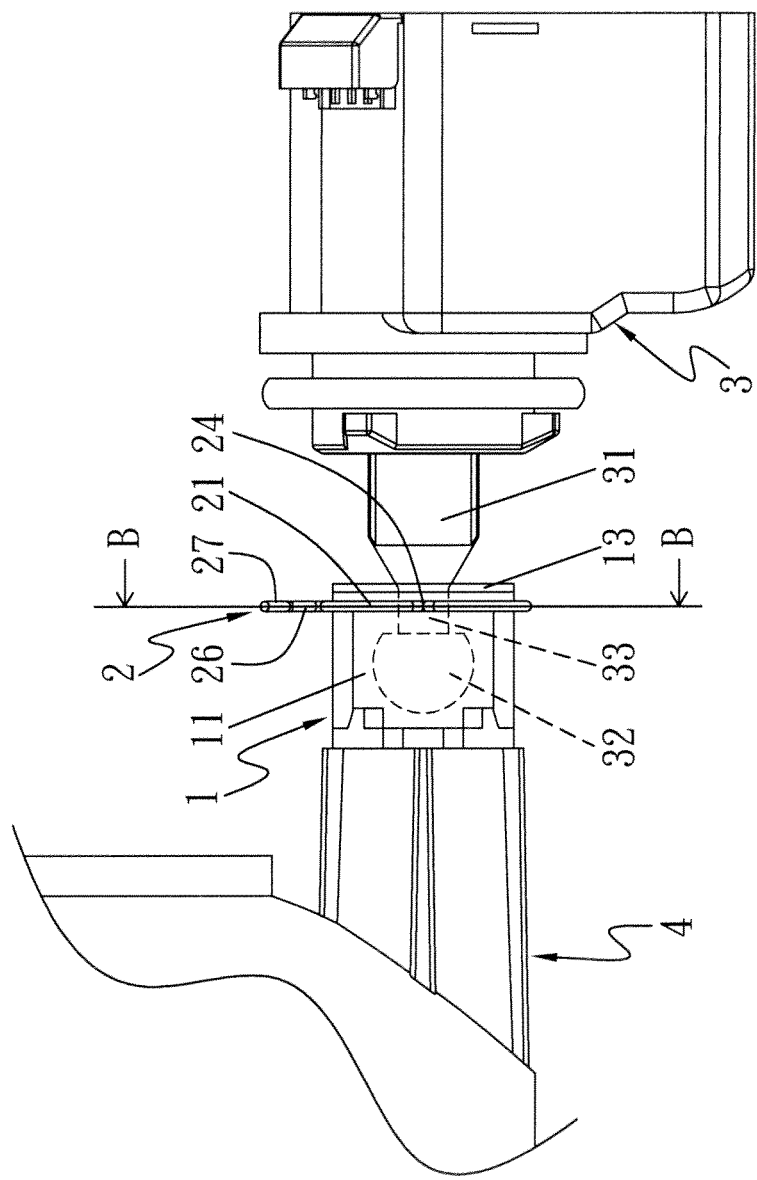
FIG. 10 is a side view to show that the second embodiment of the securing member of the present invention securely clamps the holding member to hold the sphere of the adjustment rod.
Figure 11:
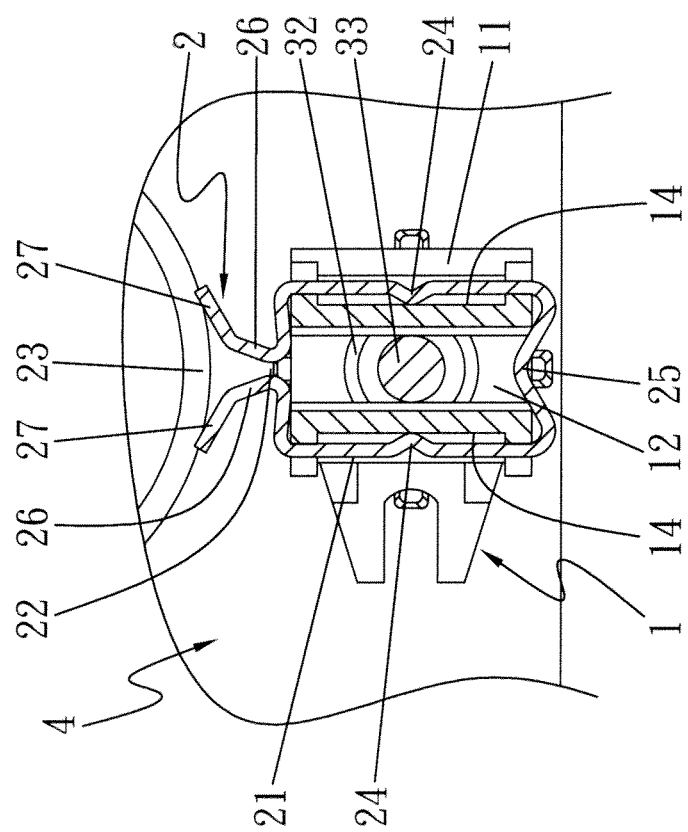
FIG. 11 is an end cross sectional view, taken along line B-B in FIG. 10.

As shown in FIG. 5, the securing member 2 is mounted to the holding member 11 and the two upright portions are engaged with the notches 16. The neck 33 of the adjustment rod 31 passes through the entrance 23 and the gap 22 by expanding the entrance 23 and the gap 22, and the sphere 32 is received in the space 12 as shown in FIGS. 6 and 7. The entrance 23 and the gap 22 bounce back after the neck 33 passes to pull the two ends of the slot 15 toward each other so retain the sphere 32 in the space 12. The neck 33 is located within the slot 15 and the adjustment rod 31 extends from the slot 15. Therefore, the sphere 32 does not disengage from the space 12 and the slot 15.

FIGS. 8 to 11 show the second embodiment of the present invention, wherein the two ends of the slot 15 each have a wing 13 connected thereto and a recess 14 is defined between each of the wings 13 and the end of the slot 15. The angle between the wing 13 and the body of the holding member 11 is less than 180 degrees.

The securing member 2 is similar to that of the first embodiment, wherein the two sections defining the gap 22 each have a first guide section 26 connected thereto, and the two first guide sections 26 are located to form a tapered opening defined therebetween. Besides, two second guide sections 27 are respectively connected to the first guide sections 26 and define the entrance 23 which is a tapered entrance. Each of the two upright portions of the securing member 2 has a bent engaging portion 24 which is engaged with the recess 14 corresponding thereto. The other one of the two transverse portions of the securing member 2, other than the transverse portion having the gap 22 and entrance 23, has a bent portion 25 which is located corresponding to the slot 15 of the holding member 11. The bent portion 25 reinforces the bounce force to return the gap 22 and the entrance 23. The first and second guide sections 26, 27 guide the neck 33 to pass through the entrance 23 and the gap 22.

The number of the engaging portions 24 can be varied according to need. The securing member 2 can only be cooperated with the engaging portions 24 or the bent portion 25.

While we have shown and described the embodiment in accordance with the present invention, it should be clear to those skilled in the art that further embodiments may be made without departing from the scope of the present invention.

What is claimed is:

1. A securing device for connecting a reflector and an adjustment unit, the adjustment unit comprising an adjustment rod having a sphere at a distal end thereof and a neck connected to the sphere, the securing device comprising:

a connector adapted to be connected to the reflector at one end and a holding member connected to another end of the connector, the holding member comprising:

an axially extending annular wall enclosing a space therein adapted to receive the sphere of the adjustment rod, the annular wall having annular flange portions at opposite axial ends of the wall, and having opposing axially extending edges defining a slot therebetween, the slot communicating with the space and adapted to receive the neck of the adjustment rod, wherein the two opposing edges of the wall each have a wing connected thereto extending between the flange portions, and two notches are defined in each of flange portions on opposing sides of the slot; and a securing member having a resilient frame comprising two upright portions and two transverse portions connected between the two upright portions at opposite longitudinal ends thereof, the two upright portions each engaged with a respective notch in each of the flange portions to bias the two opposing edges of the annular wall together, one of the two transverse portions having two sections extending from the upright portions toward each other to define a gap therebetween, each section having an extension section extending therefrom to form an entrance which communicates with the gap and is adapted to receive the neck of the adjustment rod, wherein the two sections defining the gap each have a first guide section connected thereto, the two first guide sections defining a tapered entrance therebetween;

wherein the gap is adapted to be expanded by the neck of the adjustment rod when the sphere is axially inserted into the space of the holding member, such that the neck passes therethrough and the wings of the holding member are biased to engage the neck extending through the slot, wherein the entrance and the gap of the securing member bounce back after they are expanded.

2. The device as claimed in claim 1, wherein the securing member includes a metal wire.

3. The device as claimed in claim 1, wherein an annular recess is defined between the flange portions and the wings.

4. The device as claimed in claim 3, wherein each of the two upright portions of the securing member has a bent engaging portion which is engaged with the recess corresponding thereto.

5. The device as claimed in claim 1, wherein two second guide sections are respectively connected to the first guide sections and define the entrance which is a tapered entrance.

6. The device as claimed in claim 1, wherein the other one of the two transverse portions of the securing member has a bent portion which is located corresponding to the slot of the holding member.

* * * * *